June 28, 1955  H. K. WIEMER  2,711,964
APPARATUS FOR THE PRODUCTION OF CHOCOLATE PASTE
Filed Jan. 22, 1954
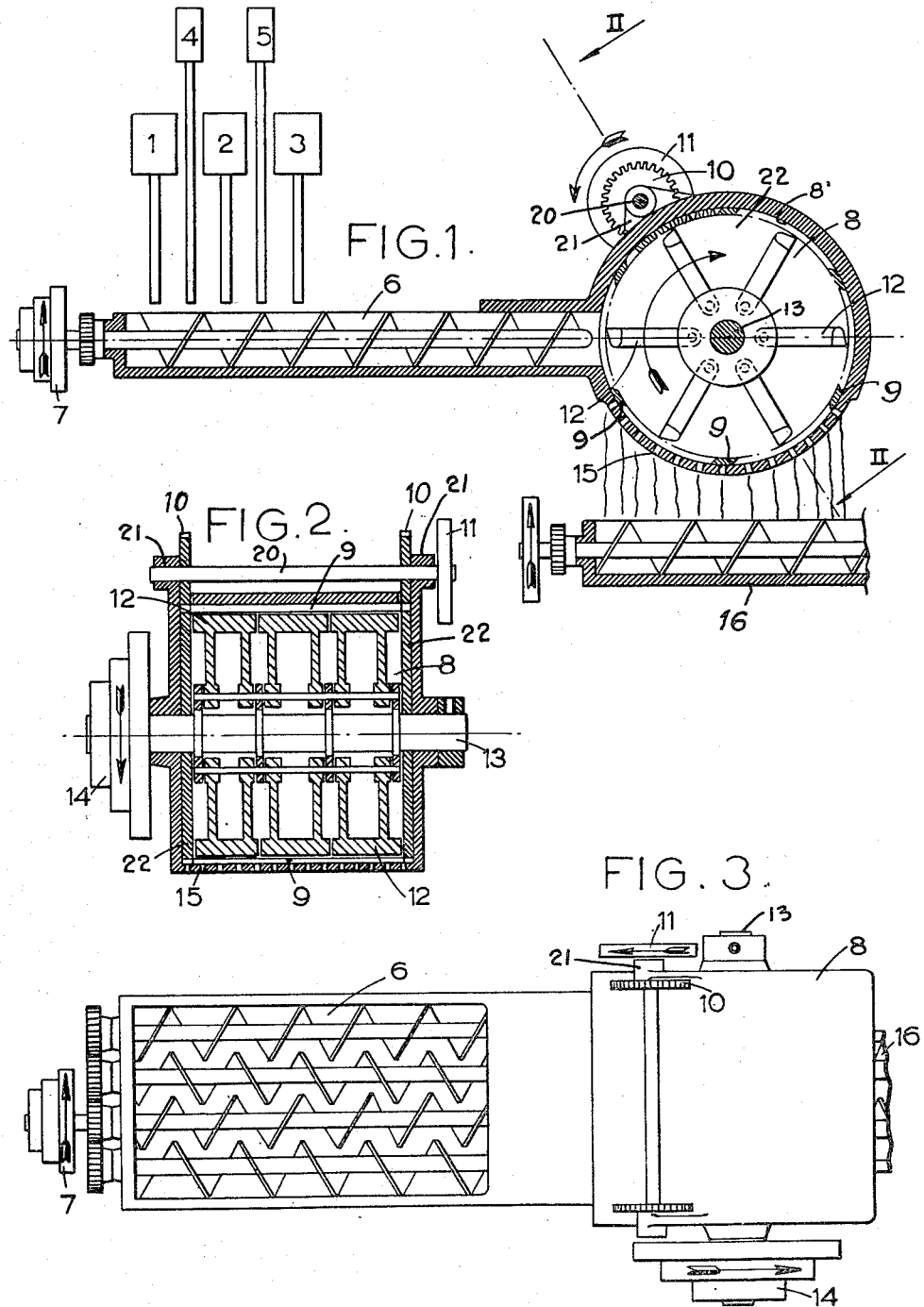
Inventor
Hermann Kurt Wiemer

United States Patent Office 2,711,964
Patented June 28, 1955

2,711,964

APPARATUS FOR THE PRODUCTION OF CHOCOLATE PASTE

Hermann Kurt Wiemer, Wallington, England

Application January 22, 1954, Serial No. 405,549

2 Claims. (Cl. 99—236)

The invention relates to apparatus for the production of chocolate paste, intended for subsequent treatment on rolls for the purpose of final grinding. In order that the rolls shall operate under optimum conditions it is essential that the chocolate paste, which is delivered to the rolls, should have a definite viscosity and fineness. Previously the mixture of ingredients for the chocolate—sugar, cocoa, milk, butter and lecithin, and so on was measured with great accuracy. Hitherto the mixing was almost exclusively carried out by so-called edge runners (melangeurs). Although these machines produced a chocolate paste suitable for subsequent rolling, they possessed a series of disadvantages which are generally known, and led to the construction and use of modern economical operating devices, such as conveying mixing machines, mixing rolls, disc mixers and so on. These operate quite rationally, but it is not in general possible to produce with them a chocolate paste of the quality produced by the old melangeurs. This is due to the fact that the sugar is usually ground too finely in the new devices and consequently the use of more cocoa butter is necessary to obtain a chocolate paste which is not too stiff. There are mixing devices which employ high speed hammer mills, for example U. S. Patent No. 2,465,828 describes such a device, but it is necessary to operate such mills below the melting temperature of the cocoa, in order to avoid the adhesion of soft chocolate mass to the mill tracks, and in fact the addition of cold air is necessary so that the work can be carried out at temperatures at which the chocolate remains pulverulent. The use of cooled air, however, increases the operating costs and necessitates the provision of extensive additional devices; moreover the cool chocolate powder must be subjected to an after treatment in a mixing machine and heated, in order that it can go forward to the rolls for further grinding. For the above reason the use of this method has not become very widespread. According to the invention the problem of providing an installation including hammer mills for continuous grinding and mixing of chocolate paste is solved by employing a mill in which a rotary scraper is disposed externally of the hammers in order to keep the grinding track clean, and by providing means for varying the speed of the hammers and of the feed device in order to be able to grind the sugar particles more finely or more coarsely so as to obtain a particular viscosity with a certain desired cocoa butter content.

A continuous process is provided under specially favourable conditions by combining such a mill with high speed weighing devices for the ingredients of the chocolate, as for example cocoa liquor, crystal-sugar, butter, milk and lecithin, which weighing devices supply the said materials directly to the feed screws for the hammer mill.

An installation of the foregoing kind has many advantages over the previously known devices; for example the ingredients of the chocolate weighed in small quantities are subjected in the minimum time to a sufficient pre-mixing and the pre-mixing device can in consequence be made quite small.

By varying the speed of the feed screws of the mill as also by varying the speed of the hammers a chocolate paste can be produced of optimum viscosity and fineness.

By reason of the use of scrapers in the mill which clean the grinding tracks, chocolate paste can be treated at a temperature which is above the melting temperature of the chocolate, and the mass so produced can be supplied directly to the rolls without further pre-treatment.

The grinding of the crystal-sugar in the hammer mill and simultaneous mixing with the cocoa prevents formation of dust. The feeding of the mill by screws prevents the inlet of air to the grinding zone, as a result of which the formation of ozone which imparts an objectionable aroma is avoided.

In the accompanying drawing Fig. 1 is a diagrammatic illustration, partly in section, of the improved installation. Fig. 2 is a section through the hammer mill on the line II—II of Fig. 1 while Fig. 3 is a plan of the installation.

In the drawings 1, 2, 3, 4 and 5 indicate the weighing devices or measuring devices for the cocoa, sugar, milk, butter and lecithin or the like. These weighing or measuring devices are provided for weighing small quantities of the order of 10–500 grams or for weighing in a continuous flow. 6 indicates feed screws with left- or right-hand threads, in which the materials are premixed and supplied to the grinding chamber. The speed of rotation of these screws can be changed by means of stepped pulleys 7. With a high speed of the screws and therefore with a great supply of material the grinding is not so fine as at lower speeds and with smaller quantities of material. 8 indicates the hammer mill provided with a cylindrical grinding track 8′. Externally of the hammers, are mounted rotary scrapers 9 scraping the upper portion of the grinding track and the screen portion 15 mounted at the lower part of the mill housing, which scrapers are driven by pinions 10 mounted on a shaft 20 supported on journals 21 on the casing of the hammer mill 8 and driven by a pulley 11 from a source of power. The pinions 10 extend through openings in the casing of the hammer mill 8 and mesh with a pair of pinions 22 freely rotatable in bearings (not shown) on the shaft 13. Between the pinions 22 and at a greater diameter than the hammers 12 extend the scraper bars 9 which are driven by the pinions 22 independently of and at a much lower speed than the hammers 12. The hammers 12 are secured to the hammer shaft 13 which is driven by stepped pulleys 14.

With high peripheral speeds greater fineness is obtained than at lower. The mass, which enters the mill through the feed screws 6 is smashed, and mixed between the hammers 12 and the scrapers 9 and is carried by centrifugal force through the screen 15 in the lower part of the mill housing to the grinding chamber. The finished ground and mixed chocolate paste falls into the conveyor screws 16 from which it is fed directly to the rolls.

I claim:

1. Apparatus for continuously grinding and mixing chocolate paste ready for a refiner, comprising a pre-mixing and feeding device, a hammer mill receiving the premixed ingredients from the feeding device, said hammer mill including hammers for grinding said ingredients and a driving means therefor, spaced rotary scrapers disposed externally of the hammers and acting on the grinding track for scraping the ingredients from the grinding track, and driving means independent of the driving means for the hammers for rotating the scrapers.

2. Apparatus for continuously grinding and mixing chocolate paste as claimed in claim 1, in which the hammer mill includes a hammer shaft on which the hammers are mounted, means for rotating said shaft at different speeds, and the means for driving the scrapers being adapted to drive the scrapers at a lower speed than that of the hammers.

References Cited in the file of this patent

UNITED STATES PATENTS

| | | |
|---|---|---|
| Re. 14,886 | Campbell | June 22, 1920 |
| 1,724,441 | Weir | Aug. 13, 1929 |
| 1,825,475 | Pfeiffer | Sept. 29, 1931 |